US008579247B2

(12) United States Patent
Weddle

(10) Patent No.: US 8,579,247 B2
(45) Date of Patent: Nov. 12, 2013

(54) SMOKE EJECTOR HANGER

(75) Inventor: David R. Weddle, Bunker Hill, WV (US)

(73) Assignee: Weddle Tool Company, Bunker Hill, WV (US)

( * ) Notice: Subject to any disclaimer, the term of this patent is extended or adjusted under 35 U.S.C. 154(b) by 263 days.

(21) Appl. No.: 12/929,537

(22) Filed: Jan. 31, 2011

(65) Prior Publication Data

US 2012/0193507 A1 Aug. 2, 2012

(51) Int. Cl.

| | |
|---|---|
| ***A47F 5/00*** | (2006.01) |
| ***F24H 9/06*** | (2006.01) |
| ***A47H 1/10*** | (2006.01) |
| ***A47G 29/00*** | (2006.01) |
| ***F16M 11/00*** | (2006.01) |
| ***B60R 7/00*** | (2006.01) |
| ***A45F 3/00*** | (2006.01) |

(52) U.S. Cl.
USPC ........ 248/693; 248/205.2; 248/317; 248/610; 248/228.1; 224/651; 224/645; 224/42.39

(58) Field of Classification Search
USPC ........... 248/693, 205.2, 233, 317, 610, 228.1; 224/651, 645, 42.39
See application file for complete search history.

(56) References Cited

U.S. PATENT DOCUMENTS

| | | | | |
|---|---|---|---|---|
| 1,846,846 | A * | 2/1932 | Coffman | 224/259 |
| 2,728,519 | A * | 12/1955 | McLarty | 416/247 R |
| 2,804,817 | A * | 9/1957 | Delf et al. | 454/208 |
| 3,037,579 | A * | 6/1962 | Barrow | 182/107 |
| 3,342,388 | A * | 9/1967 | Duckworth | 280/814 |
| 4,096,977 | A * | 6/1978 | Barville et al. | 224/148.6 |
| 4,258,895 | A * | 3/1981 | Rorie | 248/544 |
| 4,450,991 | A * | 5/1984 | Gougeon | 224/159 |
| 4,881,684 | A * | 11/1989 | Chinman | 190/115 |
| 5,484,036 | A * | 1/1996 | Cothern | 182/107 |
| 5,971,101 | A * | 10/1999 | Taggart | 182/129 |
| 6,135,334 | A * | 10/2000 | Seichter | 224/651 |
| 6,273,376 | B1 * | 8/2001 | Montgomery | 248/214 |
| 6,427,886 | B1 * | 8/2002 | Essex | 224/259 |
| 6,889,882 | B1 * | 5/2005 | Leep | 224/579 |
| 7,490,813 | B1 * | 2/2009 | Weddle | 254/93 R |
| 2004/0140407 | A1 * | 7/2004 | Morris et al. | 248/102 |
| 2005/0067450 | A1 * | 3/2005 | Trejo et al. | 224/259 |
| 2009/0294500 | A1 * | 12/2009 | Brown et al. | 224/651 |
| 2012/0193507 | A1 * | 8/2012 | Weddle | 248/674 |

* cited by examiner

*Primary Examiner* — Terrell McKinnon
*Assistant Examiner* — Christopher Garft
(74) *Attorney, Agent, or Firm* — Capitol City TechLaw

(57) ABSTRACT

A smoke ejector hanger is disclosed herein. The hanger includes a flexible pad. Hook and loop fastening means are affixed to the flexible pad for selectively retaining the flexible pad in the form of a tube. A pair of straps is affixed at the midpoints thereof to the flexible pad such that each of the straps has a pair of free ends extending outwardly from the flexible pad. One of a number of releasable fasteners is affixed to each of the free ends. Each of the releasable fasteners has a snap catch.

2 Claims, 3 Drawing Sheets

SMOKE EJECTOR HANGER

FIELD OF THE INVENTION

The present invention relates generally to resilient supports of suspended type.

BACKGROUND OF THE INVENTION

Proper ventilation permits firefighters to find and attack fires by releasing heat and smoke from confined spaces. It also inhibits smoke explosions and flashovers. The poor positioning of ventilation equipment can move either too much or too little air in a confined space. In the case of too little air movement, vision is obscured and the risk of inhaling poisonous gases is increased.

Increasing air flow, on the other hand, can cause a fire to grow and spread.

"Tactical ventilation" is a recent innovation in firefighting. Tactical ventilation involves any action used to move air to gain an advantage while fighting a fire in a confined space. For example, tactical ventilation draws fire away from the occupants of a confined space. Tactical ventilation also limits smoke, heat, and water damage. Tactical ventilation improves safety, conserves property, and reduces the time needed to put out a fire.

Tactical ventilation often involves the use of special fans, known as smoke ejectors, for drawing smoke and heat from confined spaces. When using smoke ejectors, it is necessary to have exits for the smoke (usually doors or windows) and to ensure that the exits remain open by wedging or propping. To save time, smoke ejectors are often set by firefighters in the bottom of an exit, on the floor for example, impeding the flow of air and limiting smoke ejector efficiency.

SUMMARY OF THE INVENTION

In light of the problems associated with the use of smoke ejectors by firefighters, it is a principal object of my invention to provide a smoke ejector hanger that supports a conventional smoke ejector in the middle of an opening in a building such as a window or doorway. Positioning a smoke ejector above a floor enhances the removal of fumes, gasses, and airborne soot that can obscure vision, potentially causing disorientation or entrapment in a burning structure. Furthermore, my hanger reduces the dangers posed by smoke inhalation such as: suffocating if a fire has consumed much of the oxygen in the air, poisoning if toxic substances are combusted in the fire, and burning if hot gasses are inhaled into the lungs.

It is a further object of the invention to provide a hanger of the type described that is easy for one person to set up, has no loose parts, and requires no additional tools to use.

It is another object of the invention to provide a hanger of the type described that permits the height and orientation of a smoke ejector supported thereby to be manually adjusted by a user. While supported by the hanger, a smoke ejector can be raised to practically any height within a door or window. Furthermore, the smoke ejector can be tilted to blow smoke upwardly or downwardly.

It is an object of the invention to provide improved features and arrangements thereof in a smoke ejector hanger for the purposes described which is: portable, compact, easily stored when not in use, lightweight, inexpensive to make, and dependable in use.

The foregoing and other objects, features, and advantages of my smoke ejector hanger will become readily apparent upon reviewing the following detailed description and accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
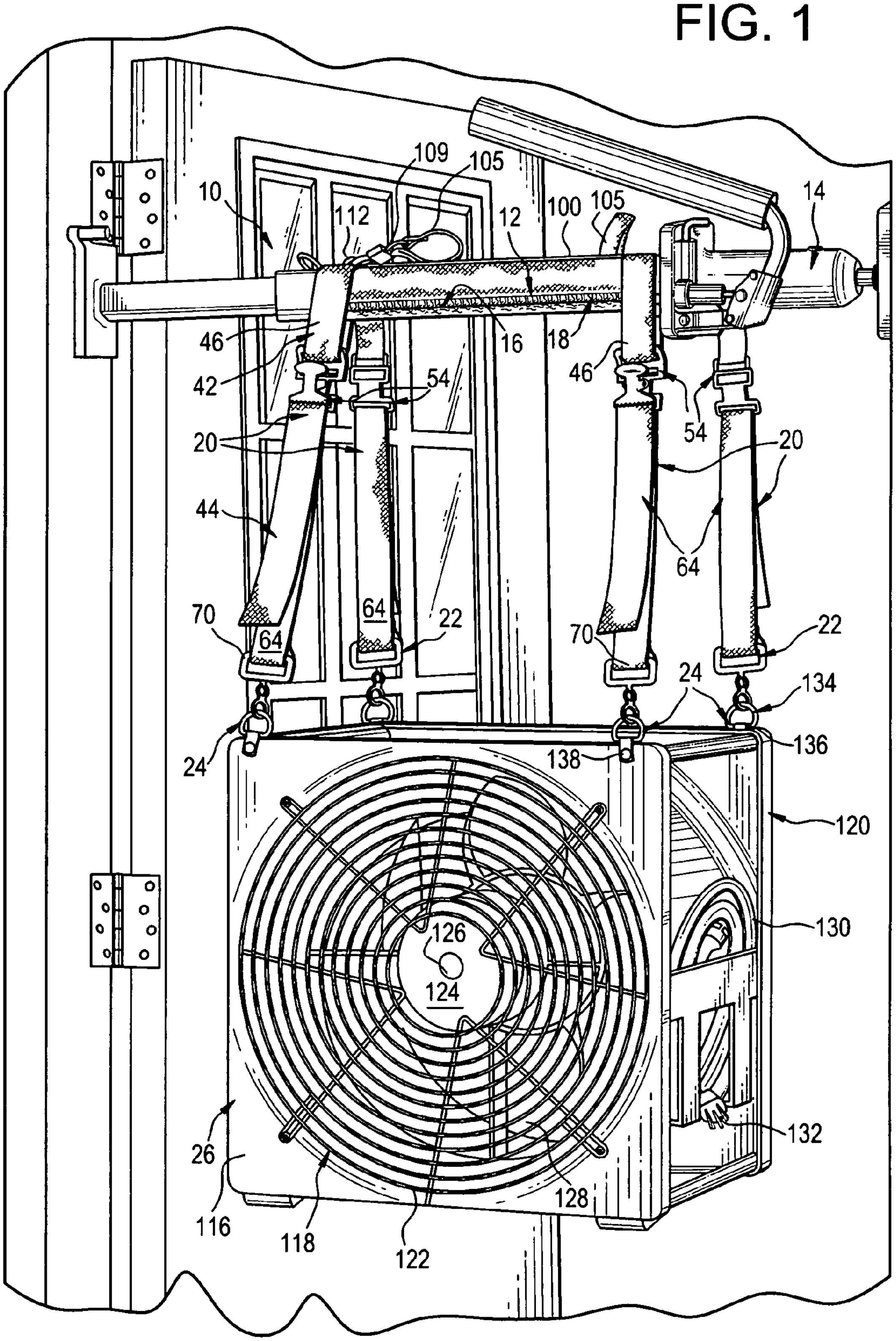
FIG. 1 is a perspective view of a smoke ejector hanger in accordance with the present invention suspending a smoke ejector in a doorway.
Figure 2:
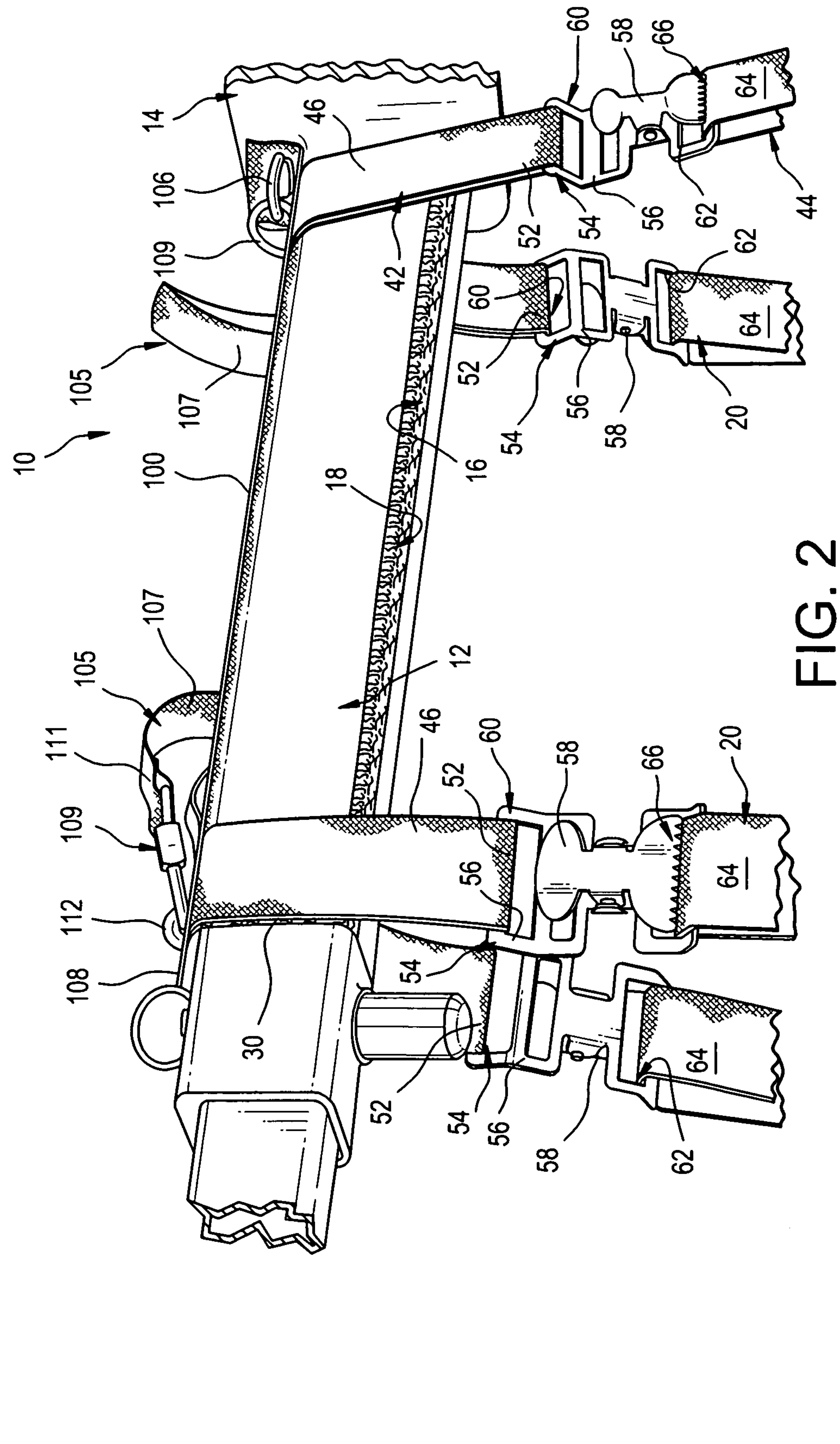
FIG. 2 is an enlarged perspective view of a portion of the smoke ejector hanger of FIG. 1.
Figure 3:
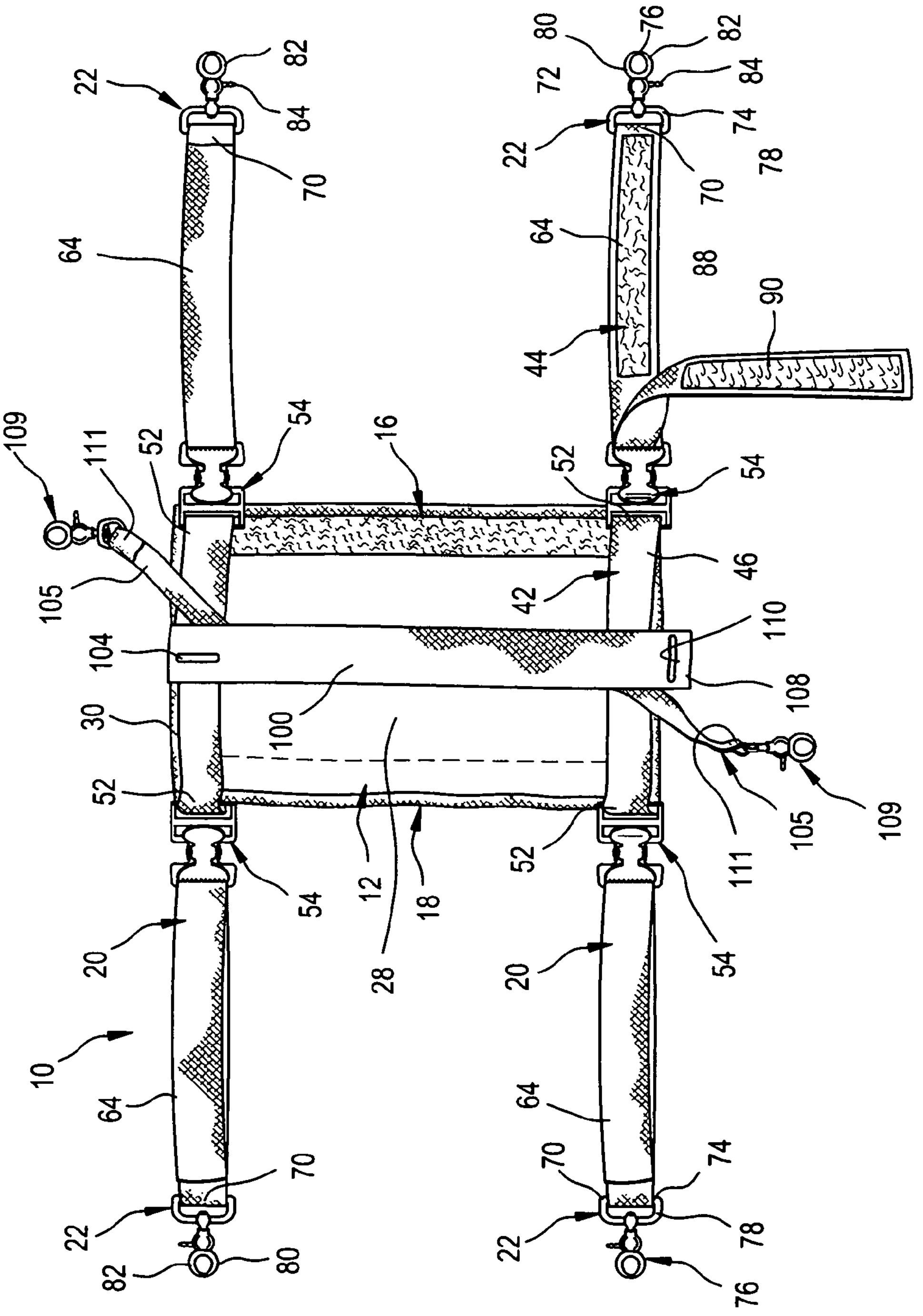
FIG. 3 is a plan view of the smoke ejector hanger with some portions thereof pulled back to reveal construction details.

Referring now to the FIGS., my smoke ejector hanger is shown at 10. The hanger 10 includes a flexible pad 12 of rectangular outline that is sized to encircle a rescue tool 14 like the one described in U.S. Pat. No. 7,490,813 which is incorporated for all purposes herein. The front and rear of the pad 12 are provided with hook-and-loop fastening portions 16 and 18 to selectively retain the pad 12 on the rescue tool 14. An adjustable-length strap 20 is affixed at its midpoint to each of the opposite ends of the pad 12. A releasable fastener 22 is affixed to each of the free ends of each of the straps 20. In use, the fasteners 22 are engaged with D-rings 24 affixed to the top of a smoke ejector 26 so as to suspend the smoke ejector 26 from the rescue tool 14 bridging a doorway 25 or other air passageway.

The pad 12 includes a rectangular piece of heavy, rubberized fabric 28. For reinforcement purposes, the periphery of the fabric piece 28 is covered by a strip of fabric binding 30 that is sewn into place. The pad 12 is about 15 inches (38 cm) long and 10 inches (25 cm) wide.

The fastening portion 16 is sewn onto the top of the fabric piece 28. As shown, the fastening portion 16 extends along the front of the fabric piece 28 and from one side of the fabric piece 28 to the other. The fastening portion 16 comprises a strip of VELCRO pile material including a dense mat of small, uncut loops formed of thread. The fastening portion 16 has a width of about 1.5 inches (3.8 cm).

The fastening portion 18 is sewn onto the bottom of the fabric piece 28. The fastening portion 18 extends along the rear of the fabric piece 28, from one side of the fabric piece 28 to the other, and has a width of about 1.5 inches (3.8 cm). The fastening portion 18 comprises a strip of VELCRO hook material having a plurality of transverse lines of hooks spaced along its length. The ends of the hooks are turned inwardly so as to catch in the loops of the fastening portion 16 when the fastening portions 16 and 18 are pressed together to adjustably wrap the pad 12 like a tube around rescue tools 14 of differing nominal diameters.

An adjustable-length strap 20 is affixed to each of the opposite ends of the pad 12. Each strap 20 includes an inner part 42 that is affixed directly to the pad 12 and a pair of outer parts 44 that are removably fastened to the free ends of the inner part 42. For the purposes of symmetry, both inner parts 42 share common dimensions and all four, outer parts 44 share common dimensions.

Each inner part 42 includes a strip of webbing 46 that is sewn at its midpoint to the rubberized fabric piece 28 about halfway between the fastening portions 16 and 18. Each webbing strip 46 is formed of nylon and measures about 1.5 inches (3.8 cm) in width and about 12 inches (30 cm) in length. By folding the ends of each webbing strip 46 back upon itself and sewing the ends together, each of the opposite ends of a strip 46 is provided with a small loop 52 for retaining a releasable fastener 54.

Each releasable fastener 54 has a base plate 56 to which a jaw 58 is pivotally fastened. The base plate 56 is provided with a pair of slots 60 and 62 at its opposite ends. One slot 60 receives a portion of a loop 52 thereby securing a fastener 54 to a strip 46. The other slot 62 is sized for the passage of the free end of a webbing band 64 so that an inner part 42 and an outer part 44 can be secured together. The jaw 58 is urged by a spring (not shown) to close the slot 62. A plurality of teeth 66 is provided on the jaw 58 for grasping a webbing band 64 and preventing the unintended disengagement of an inner part 42 from an outer part 44.

Each outer part 44, of which there are four, includes a band of webbing 64 that is extended through the slot 62 in a fastener 54. Each webbing band 64 is formed of nylon and measures about 1.5 inches (3.8 cm) in width and about 24 inches (60 cm) in length. By folding one of the ends of each webbing band 64 back upon itself and sewing, one end of each band 64 is provided with a small loop 70 for retaining a releasable fastener 22.

Each releasable fastener 22 has a base plate 74 to which a snap catch 76 is pivotally fastened. The base plate 74 is provided with a slot 78 for receiving a portion of a loop 70 thereby securing the fastener 22 to a webbing band 64. The snap catch 76 has a first jaw 80 that is pivotally fastened to the base plate 74. A second jaw 82 is pivotally fastened to the first jaw 80 and is normally urged by a spring (not shown) to close against the first jaw 80. By pulling on a pin 84, integrally formed with and extending from the second jaw 82, an opening 86 is formed in the snap catch 76.

A pair of fastening parts 88 and 90 is affixed to the opposite ends of each band 64 for forming each band 64 into a loop. Each fastening part 88 is sewn onto the top of a band 64. Each fastening part 88 extends about halfway along the length of a band 64 and from one side of the band 64 to the other. Each fastening part 88 is a strip of VELCRO pile material with uncut loops 94 formed of thread. Each fastening part 90 is secured to the top of a band 64 remote from a fastening part 88. Each fastening part 90 extends about halfway along the length of a band 64 and from one side of the band 64 to the other. Each fastening part 90 comprises a strip of VELCRO hook material with hooks 98 along its length. The ends of the hooks 90 are turned inwardly so as to catch in the loops 94 when the fastening parts 88 and 90 of a band 64 are pressed together.

A reinforcement belt 100 is sewn onto the top of the pad 12. The opposite ends of the belt 100 are also sewn atop the webbing strips 46. The belt 100 (and the adjacent portions of the fabric piece 28 and a strip 46) is provided with a slot 100 for the passage of a carrying ring 106 that projects upwardly from the rescue tool 14. Similarly, the belt 100 has a free end 108, that extends outwardly from the pad 12, with a slot 110 extending through the free end 108 for the passage of another carrying ring 112 that projects outwardly from the rescue tool 14.

One of a pair of auxiliary straps 105 is respectively secured at its inner end to each of the opposite ends of the belt 100. Each auxiliary strap 105 includes a strip of webbing 107 and a releasable fastener 109. The webbing strip 107 measures about 0.75 inches (1.9 cm) in width and about 8 inches (20.3 cm) in length. The free end of each webbing strip 107 has a loop 111 formed by sewing that retains a fastener 109 that is identical in all respects to the fasteners 22.

The smoke ejector 26 is a high-powered fan. The smoke ejector 26 shown has a rectangular, box-like housing 116 having an inlet opening 118 in its rear and an outlet opening 120 in its front. The openings 118 and 120 are both covered by protective grates 122 for safety. Mounted within the housing 116, between the openings 118 and 120, is an electric motor 124 having a horizontal drive shaft 126 that rotates when the motor 124 is energized. A fan blade 128 is affixed to the drive shaft 126 and rotates therewith. A cable 130 extends from the motor 124 and is provided with a plug 132 at its free end for connection to an electrical current source like a generator, battery pack, or wall outlet (none shown). When the cable 130 is connected by the plug 132 to an electrical current source, the motor 124 is energized to rotate the fan blade 128 to blow large volumes of air through the housing 116.

Affixed to the top of the smoke ejector housing 116 are four, ring assemblies 134. Each of the ring assemblies 134 has a D-ring 24 pivotally fastened to a mounting bracket 136. A threaded fastener 138 is provided to penetrate each mounting bracket 136 so as to affix an assembly 134 to each corner the housing 116. For the purposes of describing the manner in which my hanger 10 is used, it will be assumed that the ring assemblies 134, which are not standard equipment, have been attached to the smoke ejector 26 using conventional means well prior to the initiation of firefighting operations.

The use of my smoke ejector hanger 10 for tactical ventilation purposes is straightforward. First, the rescue tool 14 is secured horizontally in the doorway (or like passageway for air flow) 25 in a burning structure. Next, the pad 12 is fitted over the top of the rescue tool 14 such that the carrying rings 106 and 112 project through the slots 104 and 110. Now, the front and rear ends of the pad 12 are overlapped and the fastening portions 16 and 18 are pressed together to secure the pad 12 to the rescue tool 14. To ensure that the hanger 10 cannot disengage from the rescue tool 14, the releasable fasteners 109 are clipped onto the rings 106 and 112. The attachment of the smoke ejector 26 to the hanger 10 follows easily.

With the free ends of the straps 20 now hanging down from the rescue tool 14, the lengths of straps 20 are adjusted. This is easily accomplished by: 1) separating the fastening parts 88 and 90 from one another, and, if necessary; 2) repositioning the releasable fasteners 54 to desired locations on webbing bands 64 by opening the jaws 80 and 82; and 3) pressing the fastening parts 88 and 90 back into engagement with one another. Thus, by shortening or lengthening the looped outer parts 44, the straps 20 can be provided with lengths that can suspend the smoke ejector 26 horizontally as shown or can tilt the smoke ejector 26 at a desired angle.

The straps 20 are engaged with the ring assemblies 134 on the smoke ejector 26. To do this, the releasable fasteners 22 are opened to grasp the D-rings 24. The jaws 80 and 82 of each releasable fastener 22 are separated in a conventional manner and a D-ring 24 is placed in the opening 86. The internal spring of each fastener 22 holds the jaws 80 and 82 closed and prevents the hanger 10 from accidentally disengaging from the smoke ejector 26. The smoke ejector 26 is now energized by connecting it to an electrical current source so as to blow air.

The smoke ejector 26 can generate a positive or negative pressure within a closed space depending upon how it is positioned in the doorway 25. With the outlet opening 120 facing the confined space of a building interior positive pressure ventilation is initiated. By reversing the orientation of the housing 116 so that the inlet opening 118 faces the confined space, negative pressure ventilation is achieved. Depending on the tactical ventilation strategy, either positive or negative pressure ventilation may be appropriate under the circumstances. Both are made easily possible with the hanger 10 simply by the selective engagement of the releasable fasteners 22 with the D-rings 24. If a user is not satisfied with a given arrangement, it can be changed in a matter of seconds.

After the smoke ejector hanger 10 has been used, it can be easily put away. This is done by disengaging the hanger 10 from the smoke ejector 26 and rescue tool 14 by reversing the steps noted above. If desired, the disengaged hanger 10 can be washed in soap and water to remove smoke residue, ash, chemical fire retardants, and grime. After drying, the hanger 10 is folded up and stored in a secure location like a tool box or designated compartment on a fire truck. The hanger 10 is now ready for immediate reuse.

While my smoke ejector hanger 10 has been described with a high degree of particularity, it will be appreciated by those skilled in the field that modifications can be made to it. For example, cable or chain might be substituted for the webbing utilized in the straps 20. The increased weight of the resulting hanger may make it less desirable to some users, however. Therefore, it is to be understood that the present invention is not limited solely to the smoke ejector hanger 10, but encompasses any and all smoke ejector hangers within the scope of the following claims.

I claim:

1. A smoke ejector hanger, comprising:
a flexible pad;
first hook and loop fastening means being affixed to said flexible pad for selectively retaining said flexible pad in the form of a tube;
a pair of straps being affixed at the midpoints thereof to said flexible pad such that each of said straps has a pair of free ends extending outwardly from said flexible pad; and
a plurality of first releasable fasteners, each of which being affixed to a respective one of said free ends, and each of said first releasable fasteners having a snap catch;
wherein each of said straps is selectively adjustable in terms of its length and includes:
an inner part having:
a strip of webbing sewn at the midpoint thereof to said flexible pad;
a second releasable fastener being affixed to said strip of webbing, said second releasable fastener having:
a base plate with a slot therein; and
a jaw being pivotally attached to said base plate for closing said slot;
an outer part having:
a band of webbing extending through said slot;
second hook and loop fastening means being affixed to said band of webbing for selectively retaining said band of webbing in the form of a loop; and
one of said first releasable fasteners being affixed to said band of webbing.

2. A smoke ejector hanger, comprising:
a flexible pad;
first hook and loop fastening means being affixed to said flexible pad for selectively retaining said flexible pad in the form of a tube;
a pair of straps being affixed at the midpoints thereof to said flexible pad such that each of said straps has a pair of free ends extending outwardly from said flexible pad;
a plurality of first releasable fasteners, each of which being affixed to a respective one of said free ends, and each of said first releasable fasteners having a snap catch; and
a reinforcement belt being secured to said flexible pad and connecting together said straps;
wherein said reinforcement belt is provided with a pair of slots therein with one of said slots being respectively positioned in each of the opposite ends thereof for the passage of a pair of carrying rings extending from a rescue tool, and said smoke ejector hanger further comprises a pair of auxiliary straps each carrying a releasable fastener for releasable engagement with one of the carrying rings of the rescue tool.

* * * * *